(12) United States Patent
Coleman

(10) Patent No.: US 7,631,916 B1
(45) Date of Patent: Dec. 15, 2009

(54) TILTING TRUCK RACK

(76) Inventor: Tracy Coleman, 1203 Iroquois Dr., Crownsville, MD (US) 21032

( * ) Notice: Subject to any disclaimer, the term of this patent is extended or adjusted under 35 U.S.C. 154(b) by 0 days.

(21) Appl. No.: 12/008,086

(22) Filed: Jan. 9, 2008

(51) Int. Cl.
*B60P 3/00* (2006.01)
(52) U.S. Cl. .......................................................... 296/3
(58) Field of Classification Search ............... 296/3, 296/7, 14, 32; 224/405, 403, 553, 310, 280, 224/281; 414/470, 471, 486, 462
See application file for complete search history.

(56) References Cited

U.S. PATENT DOCUMENTS

| | | | |
|---|---|---|---|
| 5,360,150 A | | 11/1994 | Praz |
| 5,829,812 A | * | 11/1998 | Gionta ............................ 296/3 |
| 5,868,453 A | * | 2/1999 | Steigner ................... 296/100.1 |
| 5,884,824 A | * | 3/1999 | Spring, Jr. .................... 224/310 |
| 6,520,393 B1 | * | 2/2003 | Ferguson .................... 224/310 |
| 6,637,793 B2 | | 10/2003 | Krause |
| 6,764,268 B2 | * | 7/2004 | Levi ............................ 414/462 |
| 6,874,835 B1 | * | 4/2005 | Silverness ...................... 296/3 |
| 7,128,355 B1 | | 10/2006 | Anderson et al. |
| 2003/0175101 A1 | * | 9/2003 | Levi ............................ 414/462 |
| 2004/0047716 A1 | * | 3/2004 | Hendley et al. ............. 414/462 |
| 2007/0170217 A1 | * | 7/2007 | Lemoine ..................... 224/405 |

* cited by examiner

*Primary Examiner*—H Gutman
(74) *Attorney, Agent, or Firm*—Harpman & Harpman

(57) ABSTRACT

An overhead rack for vehicles which pivots for ease of loading and unloading large elements thereon. The rack extends above the length of the vehicle having multiple fixed support post and interengaging pivoting support post with a power activation cylinder for movement thereof. Once deployed to the side of the vehicle, a load can be attached and the pivoting material receiving rack portion is pivoted upwardly above the roof and bed of the vehicle and secured in place on the multiple fixed support post assemblies for horizontal orientation and vehicle movement transportation.

2 Claims, 4 Drawing Sheets

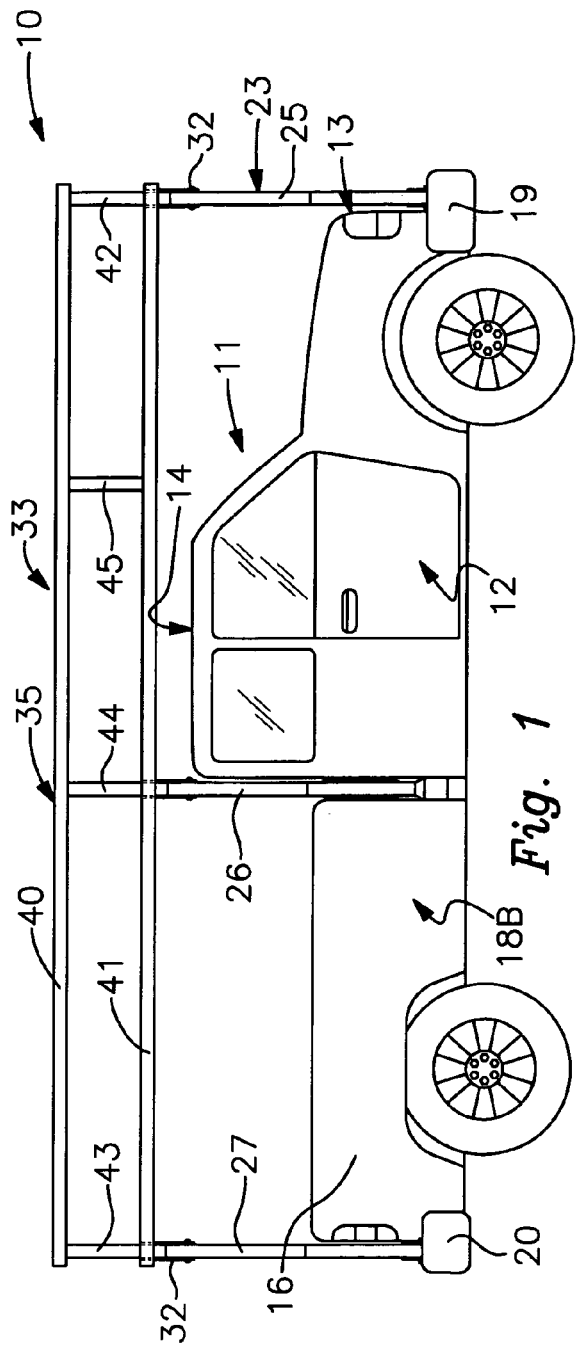
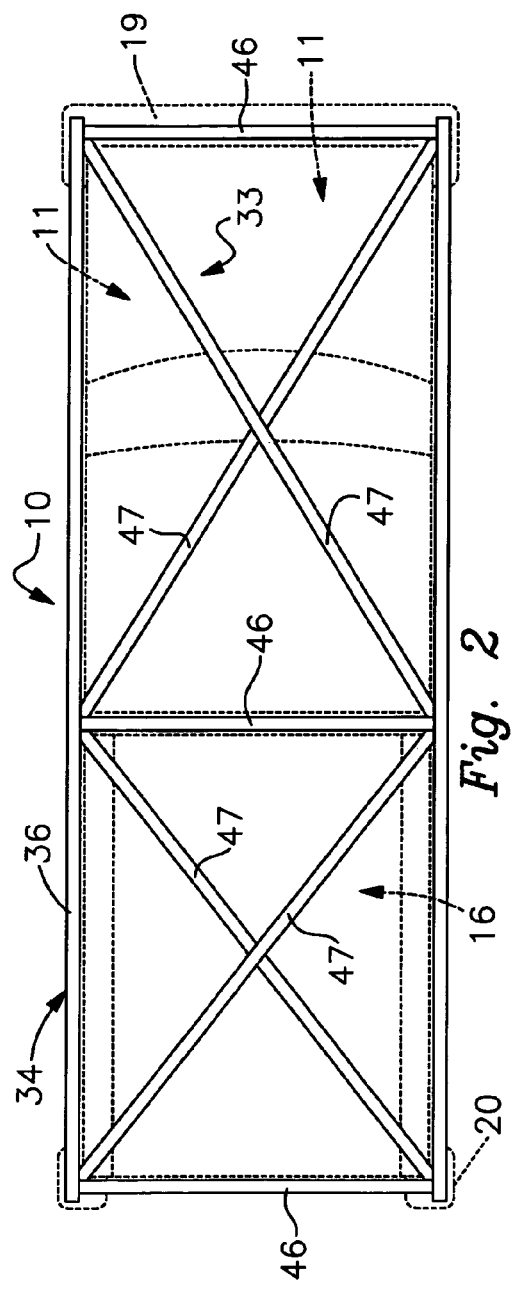

TILTING TRUCK RACK

BACKGROUND OF THE INVENTION

1. Technical Field

This invention relates to transportation racks for vehicles in which a rack is secured to the roof of a vehicle with material to be transported secured therein. Conventional work racks for pick-up trucks have been developed that extend over the cab and above the truck bed to allow for large or long items, such as building materials and the like.

2. Description of Prior Art

Prior art devices of this type have relied on a variety of different mounting structure configurations depending on the nature of the intended use; see for example U.S. Pat. Nos. 5,360,150, 6,637,793 and 7,128,355.

In U.S. Pat. No. 5,360,150 a roof rack for vehicles is disclosed having a material support rack with pivoting arms that extend therefrom onto which items can be positioned and then lifted up and slidably disposed within the main fixed support of the rack on top of the vehicle.

U.S. Pat. No. 6,637,793 is directed to a pick-up truck rack having an elongated platform with canapé. A storage canapé platform surface can be lowered at one end for loading with a skid guide mounting frame elements and power lift cylinder associated therewith.

Finally, in U.S. Pat. No. 7,728,355 a slide access truck rack is claimed in which a two-part hinged truck bed arms are pivoted down along each side of the bed for engagement of transportable items.

SUMMARY OF THE INVENTION

A continuous overlying rack for vehicles allows side hinging access for loading and unloading. The overhead rack having parallel upstanding side rails is pivotally secured to the vehicle at multiple points along one side by angularly offset support brackets. The rack is deployable, as noted, on one side of the vehicle for large load attachment then pivoted up for transportation above the vehicle for engagement on the multiple opposing fixed support brackets defining a unilateral support carrying surface thereabove.

DESCRIPTION OF THE DRAWINGS

FIG. 1 is a left side elevational view of the vehicle rack positioned on a vehicle in transportation position.

FIG. 2 is a top plan view of the vehicle rack of the invention.

DETAILED DESCRIPTION OF THE INVENTION

Figure 3:
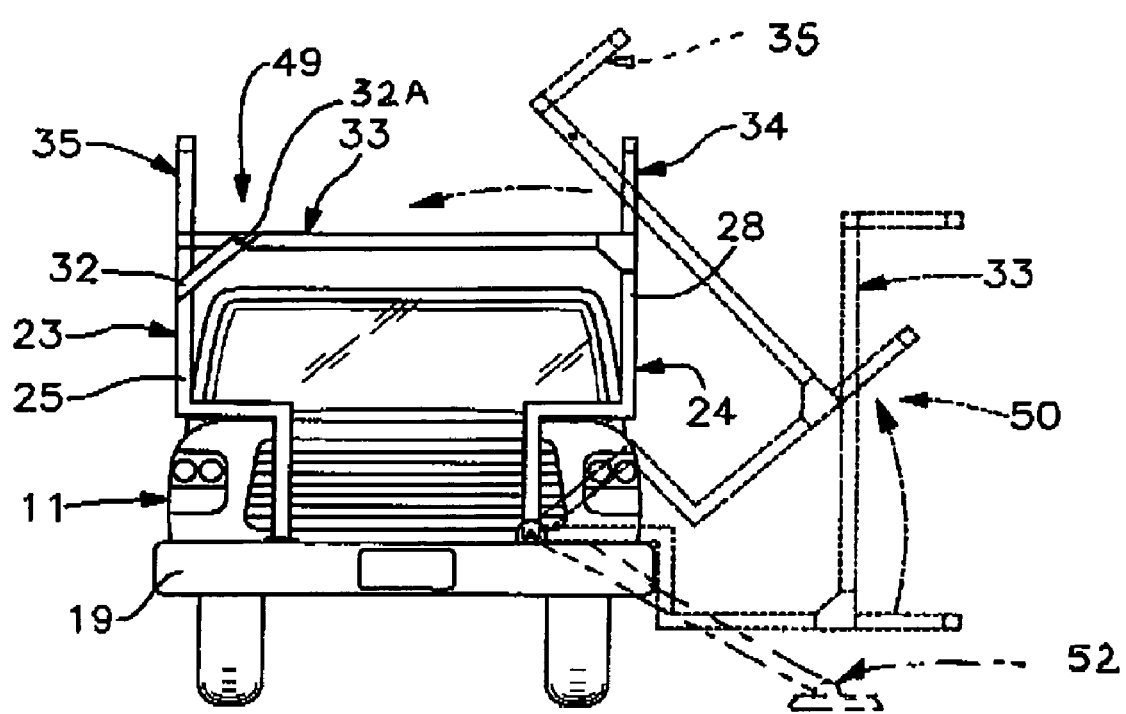
FIG. 3 is a front elevational view of the rack positioned on the vehicle showing the rack in load oriented position in broken lines.

Referring to FIGS. 1-3 of the drawings, a vehicle rack 10 of the invention can be seen on a truck type vehicle 11 having a cab portion 12 with a front 13, top 14 and rear window 15. A truck bed 16 extends from the cab 12 having a floor 17 with oppositely disposed upstanding side walls 18A and 18B with front and rear bumpers 19 and 20 as will be well known and understood by those skilled in the art.

Figure 4:
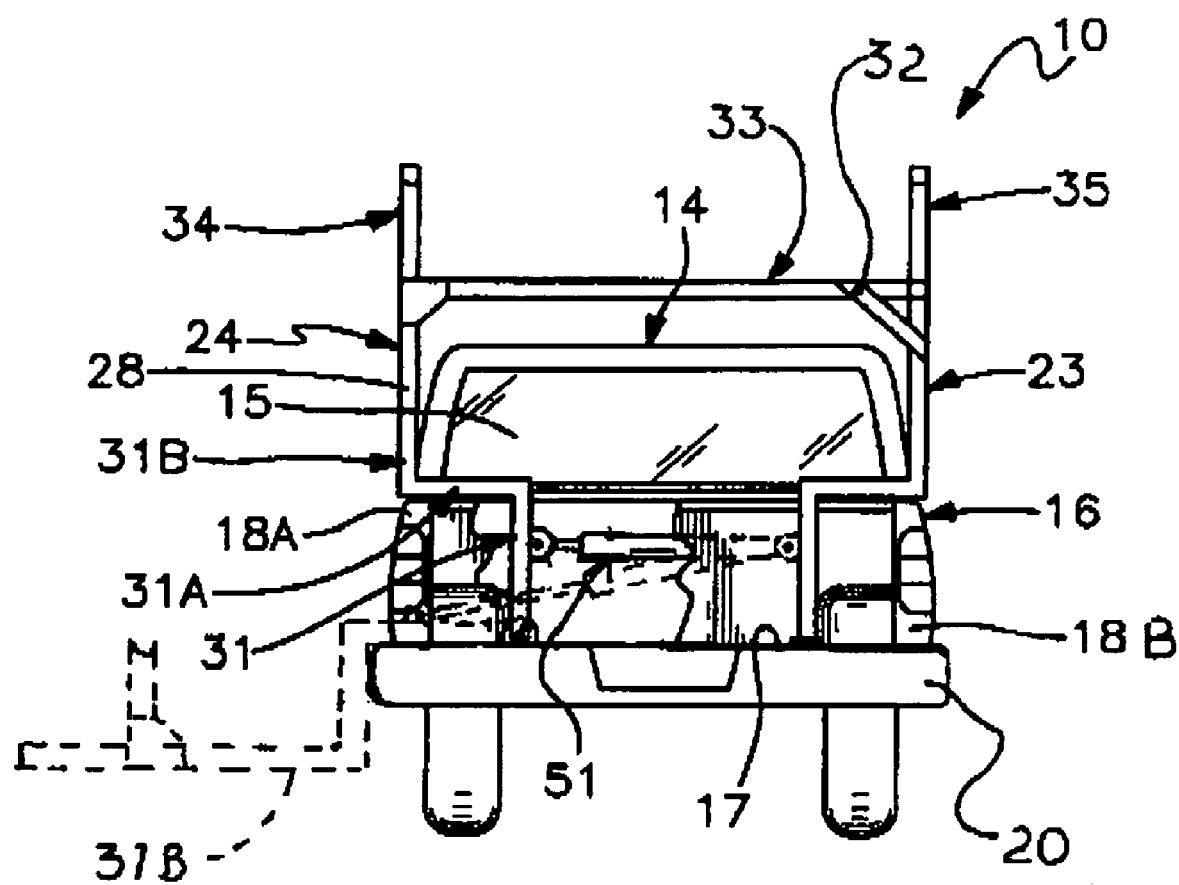
FIG. 4 is a rear elevational view of the rack mounted on the vehicle in locked transport position.

The vehicle rack 10 of the invention has a pair of post support sets 23 and 24, each set of which has multiple posts 25-27 and 28-30 respectively which extend from the vehicle's body. Each of the support posts 25-30 have a first vertically ascending frame portion 31 mounted to the vehicle 11 with a right angularly disposed frame member 31A extending therefrom. A second vertically ascending frame portion 31B is secured to and extends from the end of the frame member 31A as best seen in FIG. 4 of the drawings. The support posts 25 and 27 are secured in fixed relation to the vehicle respective bumpers 19 and 20 with the remaining support post 26 mounted on the truck frame between the truck bed 16 and cab portion 12 as shown in FIG. 1 of the drawings.

Figure 5:
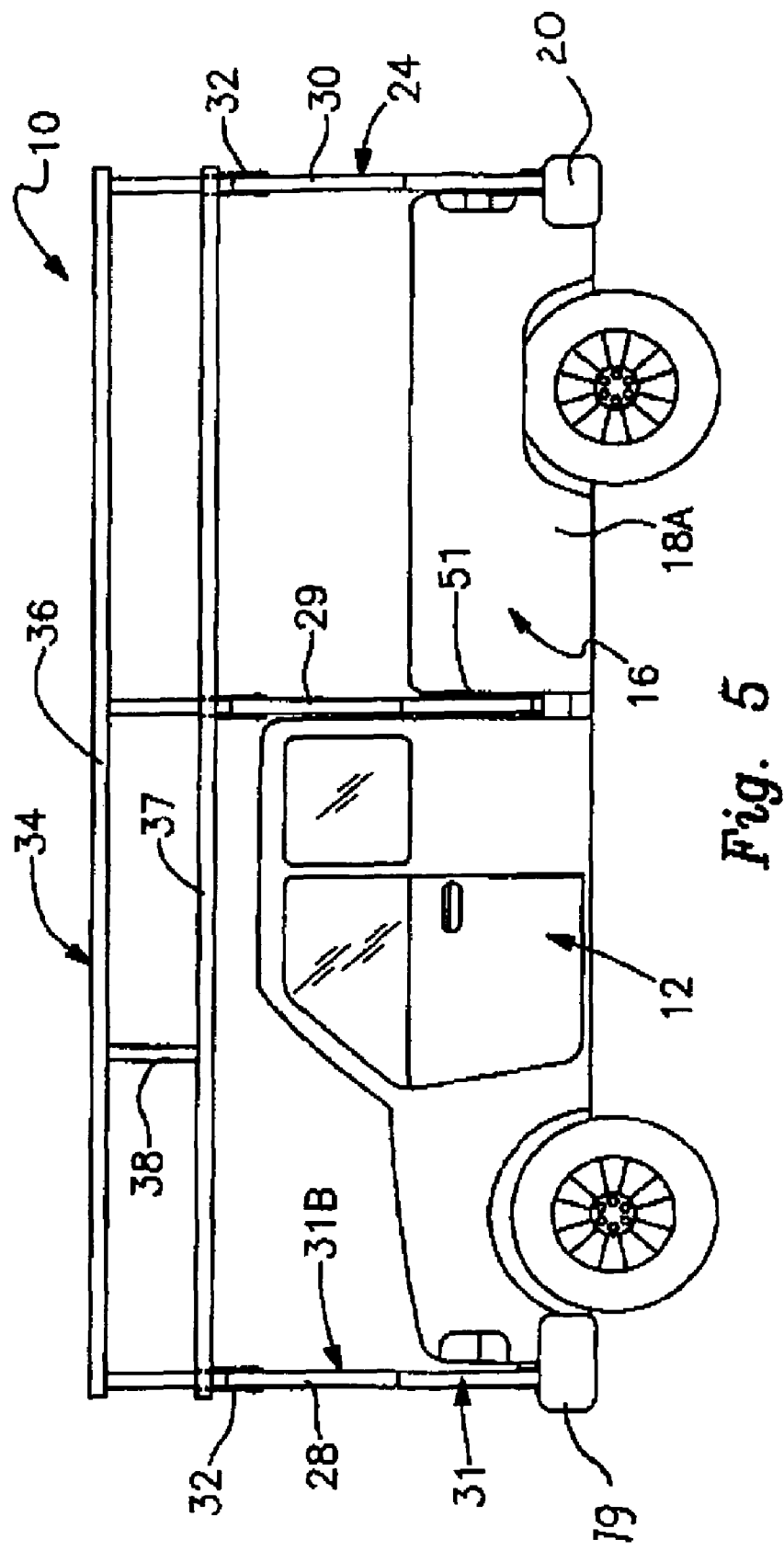
FIG. 5 is a right side elevational view of the rack on the vehicle on the defining fixed support bracket side.

Correspondingly, the support posts 28 and 30 of the post support set 24 are pivotally secured to the respective bumpers 19 and 20 with the support post 29 pivotally mounted to the truck frame between the truck cab portion 12 and truck bed portion 16 as shown in FIG. 5 of the drawings.

Each of the fixed support posts 25-27 of the post support set 23 hove a pair of aperture angularly disposed brackets 32 on their free ends thereof which will provide for registering guiding engagement with a material receiving frame 33 with an engagement pin 32A. The material receiving frame 33 extends from and is secured to the pivoting support posts 28-30 and has first and second side rail assemblies 34 and 35. It will be seen that the vertically ascending post portions 31B as hereinbefore described of the support posts 28-30 will define the vertical support elements of the first side rail assembly 34 which has spaced parallel horizontally disposed upper and lower rail elements 36 and 37 secured thereto and a vertical frame element 38 extend between the respective side rails 36 and 37 midway between the post extensions hereinbefore described.

The second side rail assembly 35 has corresponding upper and lower horizontally disposed side rail frame elements 40 and 41 with vertical end interconnecting elements 42 and 43 and intermediate interconnecting elements 44 and 45 therebetween.

The first side rail assembly 34 is secured to the second side rail assembly 34 by a plurality of right angularly disposed cross support members 46 at their respective ends and midway therebetween. Additionally, pairs of angularly disposed cross support frame assemblies 47 are crisscross positioned between the hereinbefore described side rail assemblies 34 and 35 which in combination with the rail assembly define a rectangular shape of the material receiving frame 33 extending over the entire length of the vehicle 11 as illustrated graphically in FIG. 2 of the drawings.

As evident from the above description, the material receiving frame 33 and integral post support sets 24 can be pivoted from a horizontal position indicated at 49 which is over the top of the vehicle 11 to a vertically disposed load and unload position at 50 beside the vehicle 11 as seen in FIG. 3 of the drawings in broken lines sequentially.

In the horizontal transport position 49 the secondary side rail assembly 35 is, as noted, registerably engaged with the fixed multiple support post brackets 32 on the support posts 25-27 as hereinbefore disclosed.

In use for activation, a hydraulic piston and cylinder assembly 51 located and secured to the non-moving vertical support post 23 between the truck bed 16 and cab portion 12 and is interconnected to the pivoting support post 29 and integral material receiving frame 33 will control the pivoting actuation thereof. The material receiving frame 33 is moved via the hydraulic piston and cylinder assembly 51 from the horizontally disposed transport position to the vertically oriented side load and unload position 50 wherein the material receiving frame 33 is now vertical as seen in FIG. 3 of the drawings. Once loaded or unloaded, the material receiving frame 33 is pivoted upwardly and over the vehicle 11 engaging the aligned fixed support post set 24 by activation of the piston and cylinder assembly 51. It will be evident that given the variety of vehicle manufacturers variations in frame, cab and bed configurations, the support post sets 23 and 24 and material receiving frame 33 will be of dimensions that can be selectively adjusted by extensible frame element means well known within the art such as telescopically extensible fittings.

It will be seen that in some large load venues additional truck frame support will be needed. By referring to FIG. 3 of the drawings, auxiliary telescopically extensible outrigger supports 52 can be added, shown in broken lines in such applications.

It will thus be seen that a new and unique overhead vehicle rack for pick-up truck type vehicles has been illustrated and described and it will be apparent to those skilled in the art that various changes and modifications may be made thereto without departing from the spirit of the invention.

Therefore I claim:

1. A vehicle rack for use on a pick-up truck having a truck cab and truck bed with upstanding side walls and front and rear bumper portions, the vehicle rack comprises, a plurality of fixed and pivoted support posts extending from said truck in oppositely disposed spaced relation to one another, a material receiving frame extending in fixed relation from said pivoted support posts, said pivoted support posts are pivotally secured directly to said truck at their respective pivot points, said material receiving frame comprises, a pair of upstanding rail assemblies secured to one another in spaced parallel relation by multiple interconnecting frame elements and criss-cross support frame elements on said material receiving frame between said upstanding side rails, a power activated control cylinder assembly pivotally engageable between one of said pivoted support posts and one of said fixed support post in spaced oppositely disposed relation to one another, fixed multiple angularly disposed brackets on said fixed support posts for selective engagement with said material receiving frame when moving said material receiving frame from a first transport position over said truck cab and truck bed to a second loading and unloading vertically oriented position beside said vehicle.

2. The vehicle rack for use on a pick-up truck set forth in claim 1 wherein portions of said support posts hove second vertical ascending frame portions which are vertically offset from first vertical ascending frame portions extending from said truck.

\* \* \* \* \*